US006925474B2

(12) United States Patent
McGrath et al.

(10) Patent No.: US 6,925,474 B2
(45) Date of Patent: Aug. 2, 2005

(54) VIDEO INFORMATION RETRIEVAL

(75) Inventors: Mark John McGrath, Bracknell (GB); Morgan William Amos David, Farnham (GB)

(73) Assignee: Sony United Kingdom Limited, Weybridge (GB)

(*) Notice: Subject to any disclaimer, the term of this patent is extended or adjusted under 35 U.S.C. 154(b) by 593 days.

(21) Appl. No.: 10/006,425

(22) Filed: Dec. 6, 2001

(65) Prior Publication Data

US 2002/0116392 A1 Aug. 22, 2002

(30) Foreign Application Priority Data

Dec. 7, 2000 (GB) .............................................. 0029893

(51) Int. Cl.[7] .......................... G06F 7/00; G06F 17/00; G06F 17/30
(52) U.S. Cl. ....................................... 707/104.1; 707/1
(58) Field of Search ............................. 707/3, 10, 100, 707/104.1, 200, 102; 386/46, 69; 715/501; 709/229

(56) References Cited

U.S. PATENT DOCUMENTS

| | | | | |
|---|---|---|---|---|
| 5,956,716 A | * | 9/1999 | Kenner et al. ................. | 707/10 |
| 6,493,707 B1 | * | 12/2002 | Dey et al. ....................... | 707/3 |
| 6,502,137 B1 | * | 12/2002 | Peterson et al. ............ | 709/229 |
| 6,598,051 B1 | * | 7/2003 | Wiener et al. ............... | 707/100 |
| 2002/0069218 A1 | * | 6/2002 | Sull et al. ................ | 707/501.1 |

FOREIGN PATENT DOCUMENTS

WO    WO 00/33575    6/2000

OTHER PUBLICATIONS

The Integration of the World Wide Web and Intranet Data Resources, Noah, W. W., Systems Science, 1998., Proceedings of the Thirty–First Hawaii International Conference on, vol.: 4, 1998, Page(s): 496–502, vol. 4.

Visually Searching the Web for Content, Smith, J. R. Shih–Fu Chang, IEEE Multimedia, vol.: 4 Issue: 3, Jul.–Sep. 1997, Page(s): 12–20.

Imagerover: A Content–Based Image Browser for the World Wide Web, Sclaroff, S.; Taycher, L.; La Cascia, M. Content–Based Access of Image and Video Libraries, 1997. Proceedings IEEE Workshop on, 1997, Page(s): 2–9.

* cited by examiner

*Primary Examiner*—Frantz Coby
*Assistant Examiner*—Merilyn Nguyen
(74) *Attorney, Agent, or Firm*—Frommer Lawrence & Haug LLP; William S. Frommer; Samuel S. Lee

(57) ABSTRACT

A video information retrieval system comprising a client system having a request issuer for issuing a search request in respect of desired video material; and a video accessor for accessing video material on the basis of a uniform resource locator (URL) and a SMPTE unique material identifier (UMID). The retrieval system also comprising a server system having access to one or more databases containing metadata information relating to a plurality of video material items, a UMID associated with each video material item and at least one URL associated with each UMID. A receiver is provided for receiving a search request from the client system and detecting one or more video material items for which metadata information stored in at least one of the database(s) substantially corresponds to the search request. An information supplier supplies the metadata information, the URL and the UMID relating to the one or more detected video material items to the client system. The server system has at least one video repository having: a video storage arrangement storing video material and associated UMID data. The metadata, the URL and the UMID are communicated between the server and the client using a markup language having descriptors for data content.

19 Claims, 4 Drawing Sheets

```
<media>
  <metadata objects>
    <person href=" ...."> Bill Clinton </person>
    <person href=" ..."> Nelson Mandela </person>
    <place href=" ...">London </place>
    <topic href=" ...">global warming </topic>
  </metadata objects>
  <metadata tracks>
    <person track person="BillClinton">
      <track numbers> xxx </track numbers>
      <UMID> xxx </UMID>
    </person track>
  </metadata tracks>
</media>
```

FIGURE 3

VIDEO INFORMATION RETRIEVAL

BACKGROUND OF THE INVENTION

1. Field of the Invention

This invention relates to video information retrieval.

2. Description of the Prior Art

Video images are a useful resource for entertainment and for dissemination of information. Digital video images are also increasingly being used in a wide range of multimedia applications.

The sheer volume of video information currently available to the user is overwhelming with the existence of many video libraries and archives each of which potentially stores millions of images. These video archives have a broad spectrum of users running different applications and requiring a range of services from provision of subject-specific video clips for editing purposes to video on demand. In practical terms the video archive environment must allow users to run custom applications which utilise a common database of video images and provide descriptive data related to the video images to allow the user to make an informed choice of which media file to download. The generic term for the descriptive data associated with video images is metadata.

Computer database management systems have proved to be very effective for organising text and numeric data. The most widespread database management systems are known as "relational" databases. These systems collect data and organise it as a set of formally described tables from which data can be accessed selectively and reassembled in a variety of ways without having to reorganise the data tables. The standard user and application program interface (API) to a relational database is the structured query language (SQL) which can be used for simple interactive queries as well as for more extensive data gathering for use in compiling reports.

A further example of an information management system is a web search engine. The web search engine is ideally suited for use in a multimedia environment and has three basic components:

A program known as a "spider" that goes to every page or representative pages on every web site that wants to be searchable and reads it, using hypertext links on each page to discover and read a site's other pages.

A program that creates a master index from the pages that have been read.

A program that receives a user's text-based search request, compares it to the entries in the master index, and returns results to the user.

Video archives are of very limited value to the user unless there is an information management system for images capable of delivering images based on their specific content. This video information management system is likely to require features used in database management systems as well as some of the functionality of the web search engine. One difficulty is that image and video data require a much higher bandwidth than text-based information. Downloading a video clip across a computer network can be very time consuming because of the large quantity of data involved. In some cases the user may have to download and view several video clips in real time in order to find a clip with the required information content. Thus it is very important to provide the user with adequate information about images in the archives prior to any download to increase the likelihood of the downloaded images meeting the user-specific requirements. Some users may be looking for video clips that can be used to illustrate a particular feature or issue, for example, video segments showing a particular politician or dignitary. Other users might be searching for complete programmes and news items related to a specific topic such as global warming. It would also be advantageous to the user to have unrestricted access to as many video archives as possible via a single video-specific search query.

A typical prior-art video information retrieval system for use on the world-wide web is illustrated in FIG. 1. Video source material 10 is input as raw video information 15 to an encoding and content-analysis module 20. The source material could be a digital or analogue video-cassette, an electronically stored digital video file or a broadcast signal fed directly via satellite The encoding and content-analysis module 20 takes the video source material and produces digital copies it in various alternative formats ranging from low bit-rate versions suitable for use on Internet browser plug-ins such as RealVideo™ to high bit-rate broadcast quality MPEG2 images.

On input to the video archive system the analogue or digital source material is subject to an automated content-analysis process. This typically involves the use of local intensity histograms, edge histograms, geometrical shape analysis, face detection and on-screen text extraction to establish and log the content of each image. The associated audio samples may be processed for content using speech detection algorithms. Proprietary content-analysis software such as Virage's Videologger™ has been be used for this purpose. The result is a video index 25 which summarises the content of the video material.

A video application server 30 stores the video index 25 in an appropriate format so that it is accessible to a web server 40. In addition the video application server 30 provides a flexible template system, handles client-queries and provides administration tools. Clients 60 running Internet browsers have access to the video index via the web server 40. The clients may enter search terms in a standard web search engine which is interfaced the video index so that video material can be selectively retrieved on the basis of its logged content.

The encoding and content-analysis module 20 outputs the digital video information 65 across a distribution network. The digital video information 65 is available for download to the clients via a video server 50. The video index 25 is used to search for and retrieve particular video clips required by users.

SUMMARY OF THE INVENTION

The invention provides a video information retrieval system comprising:

a client system having:

means for issuing a search request in respect of desired video material; and means for accessing video material on the basis of a uniform resource locator (URL) and a SMPTE unique material identifier (UMID);

a server system having:

access to one or more databases containing metadata information relating to a plurality of video material items, a UMID associated with each video material item and at least one URL associated with each UMID;

means for receiving a search request from the client system and detecting one or more video material items for which metadata information stored in at least one of the database(s) substantially corresponds to the search request;

means for supplying the metadata information, the URL and the UMID relating to the one or more detected video material items to the client system;

and at least one video repository having:

a video storage arrangement storing video material and associated UMID data;

In which the metadata, the URL and the UMID are communicated between the server and the client using a markup language having descriptors for data content.

The invention provides an improved video information retrieval system which (a) uses UMIDs to access video material, thereby providing a unique and platform-(or vendor-) independent index to the video material, and (b) uses a markup language having descriptors for data content as the transmission means for the search results, which means again that the communication required for the video information retrieval system can potentially be platform- and vendor-independent as such markup language files are potentially transmissible via the generally available http port 80.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 3 and 4 are schematic examples of the use of XML data structures.

DESCRIPTION OF THE PREFERRED EMBODIMENTS

Figure 1:
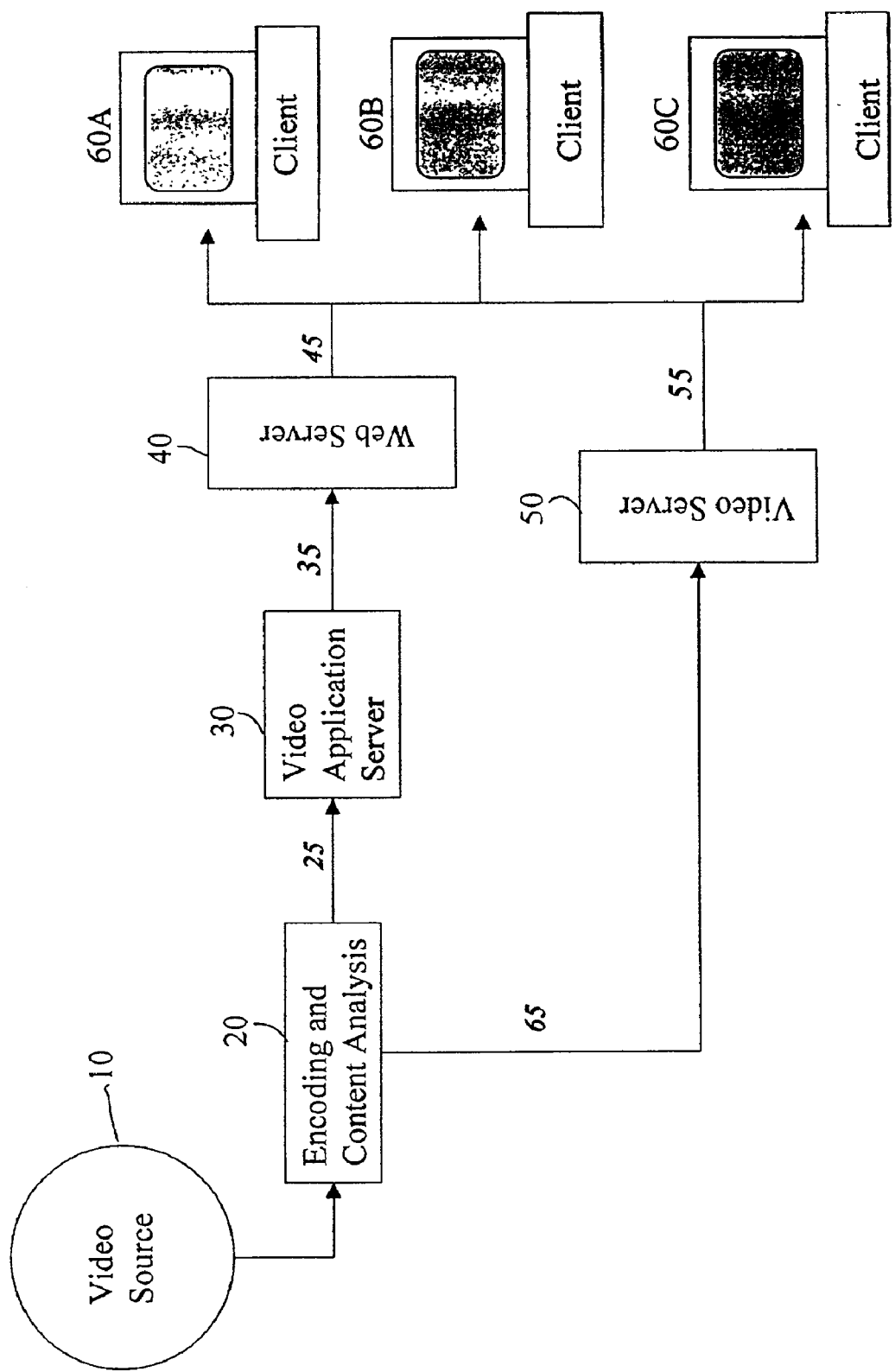
FIG. 1 schematically illustrates a prior art video information retrieval system.
Figure 2:
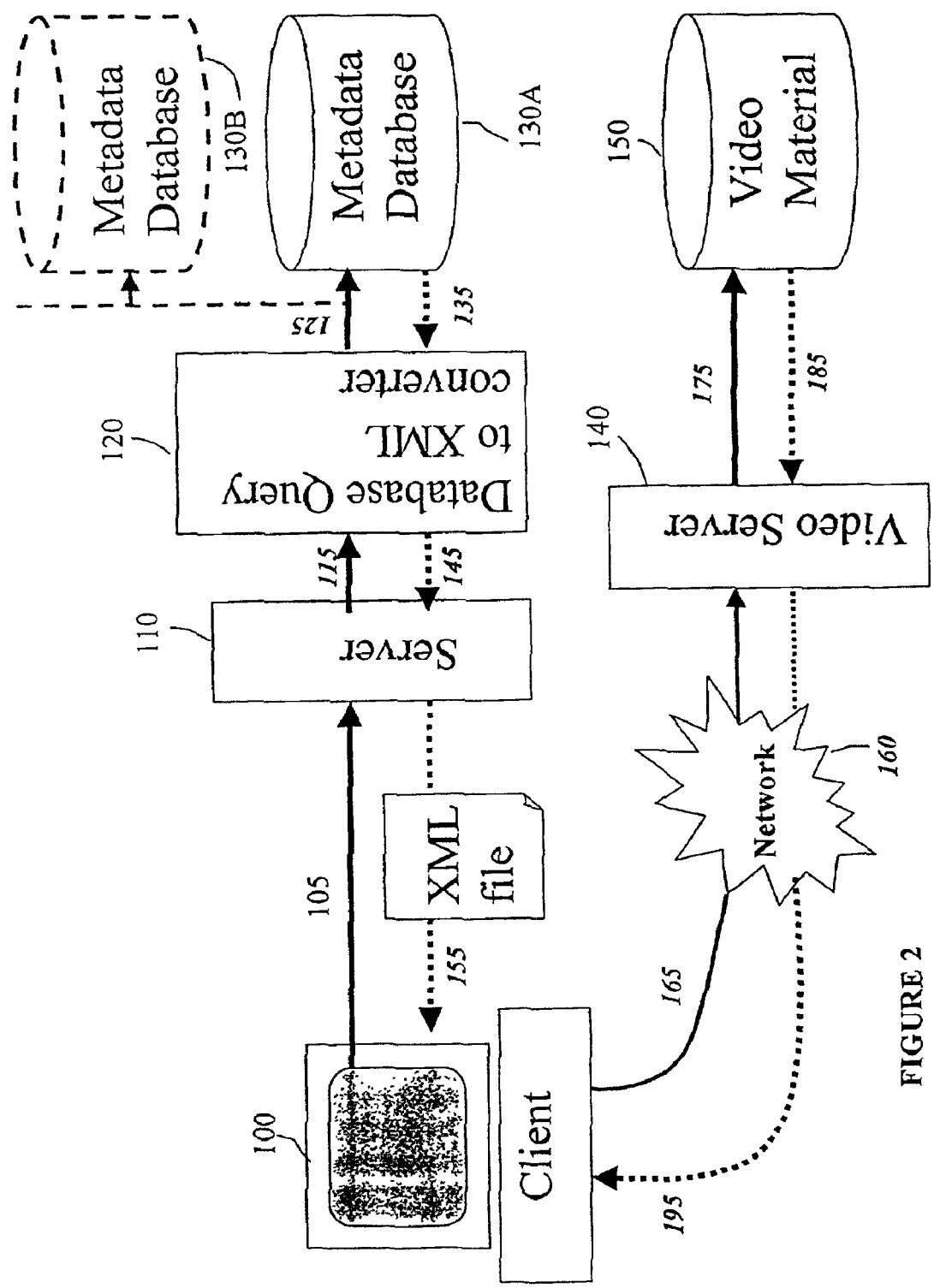
FIG. 2 is a schematic diagram of a video information retrieval system according to an embodiment of the present invention.

Referring now to the drawings, FIG. 2 is a schematic illustration of a video information retrieval system according to an embodiment of the invention. A client 100 running a web browser initiates a search request 105 specifically directed to video material. The search is performed via a web search engine. The search engine communicates via a common gateway interface (CGI) on a server 110. The search engine converts the client request to a database query 115 and the client request is output as a signal 125 to a metadata database 130A or, if so required, to a series of databases (130A, 130B . . . ) distributed across the Internet.

The main obstacle in attempting to gain access to remote databases of video material via the Internet is that in many cases client and server machines will be separated by a firewall or proxy server. A firewall is a set of related programs, located at a network gateway server, that protects the resources of a private network from users of other networks. By working closely with a router program, a firewall filters all network packets and decides whether or not to forward them to their destination. A proxy server which makes network requests on behalf of users may be included in a firewall or work closely with it. Firewalls are generally able to distinguish one protocol from another. In the Transmission Control Protocol/Internet Protocol (TCP/IP) architecture a specific port number is assigned to each common protocol and each request made using that protocol carries that number. For example HTTP is assigned to port 80 while File Transfer Protocol (FTP) is assigned to port 21. Most firewalls allow blocking of a specific protocol by rejecting all traffic sent on the port number associated with that protocol. Most firewalls are configured to let through traffic on port 80 which is how HTTP requests from browsers get through. Since each unblocked protocol poses a potential security threat, firewalls are generally set up to block most ports with the exception of port 80. As shall be explained below, the interchange between the client and the metadata database according to embodiments of the invention, is in a markup language that has descriptors for data content such as XML. Since XML is text-based, advantage can be taken of HTTP port 80 to deploy an Internet-wide video archive search facility. HTTP alone would not be sufficient to implement searches on remote databases of video material across multiple platforms because it lacks a single standard format for representing queries. Because XML is a platform-neutral data representation, it can be used on top of HTTP to serialise data into a transmissible form that is easily decoded on any platform. This is the basis on which remote procedure call (RPC) protocols such as Microsoft's Simple Object Access Protocol (SOAP™) operates. RPCs are specially designed to provide access to computer program objects resident on machines that are distributed across the Internet.

In a video retrieval system designed for deployment across the Internet there will be no central management of the video archives, and therefore it is very important to be able to uniquely and unambiguously identify each video clip that is accessible to the user. The metadata database 130 uses the SMPTE UMID to relate the stored metadata to the particular video material from which it was generated.

The UMID is described in the March 2000 issue of the "SMPTE Journal". An "extended UMID" comprises a first set of 32 bytes of "basic UMID" and a second set of 32 bytes of "signature metadata".

The basic UMID has a key-length-value (KLV) structure and it comprises:

A 12-byte Universal Label or key which identifies the SMPTE UMID itself, the type of material to which the UMID refers. It also defines the methods by which the globally unique Material and locally unique Instance numbers (defined below) are created.

A 1-byte length value which specifies the length of the remaining part of the UMID.

A 3-byte Instance number used to distinguish between different "instances" or copies of material with the same Material number.

A 16-byte Material number used to identify each clip. A Material number is provided at least for each shot and potentially for each image frame.

The signature metadata comprises:

An 8-byte time-date code identifying the time of creation of the "Content Unit" to which the UMID applies. The first 4-bytes are a Universal Time Code (UTC) based component.

A 12-byte value which defines the (GPS derived) spatial co-ordinates at the time of Content Unit creation.

3 groups of 4-byte codes which comprise a country code, an organisation code and a user code.

The metadata databases 130 contain data describing the content of video material. The metadata includes location information for the video images to which it corresponds, such as a uniform resource locator (URL). The URL for a video clip is associated with the UMID identifier and an additional timecode can be used to obtain particular still images from a given clip. The metadata also includes analysis data from post-processing of the image signal such as sub-shot segmentation information and information about an image frame called a representative keystamp (RKS) which gives a visual indication of the predominant overall contents of each shot or sub-shot.

Proprietary content-extraction tools such as Virage's Videologger™ can be used to obtain descriptive information about the component "objects" in each video clip such as people, buildings, cities, the topic or event to which the clip relates, actors names and details of the ownership rights of the footage. The content-index for each video clip is stored as metadata. The metadata can be stored in the databases 130 in any format.

As illustrated in FIG. 2, the server 110 responds to the client search request 105 by returning an XML file 155 containing metadata for the video clips which match the user's search request. XML is an example of a markup language. Although XML is the preferred markup language for interchange of data between the client and the databases 130, any markup language that has descriptors for data content could be used. Markup languages are computer programming languages in which document structures are indicated in the same stream as the text. Markers like < and > divide documents into elements and attributes. Elements are containers hold that hold content and possibly other elements inside them in a hierarchy. Attributes provide additional information about a particular element. Elements and attributes are specified by tags enclosed in < and >. A start tag includes the element name and the names and values of the attributes while an end tag is marked by a forward-slash character and includes only the name of the element corresponding to the start tag that it matches. The syntax is as follows:

Start tag: <elementName attributeName = "attribute Value">
text included here in body of element
End tag: </elementName>

Hypertext markup language (HTML) is the language of the world-wide web and its tags comprise a pre-defined and non-extensible set that describe document format i.e. how the contents of a document should be displayed. XML has tags which define an information structure by describing document content rather than document format. It allows developers to extend the set of tags used and to create their own vocabulary for describing information. A "schema" is a set of rules that describes a given class of XML documents. The schema defines the elements that can appear and their corresponding attributes. It also defines the hierarchical structure by specifying which elements are child elements of others, the order in which child elements appear and the number of child elements. XML is a simplified subset of its parent markup language, Standard Generalised Markup Language (SGML). XML is designed to allow the exchange information between a host of different applications running on different types of computers without repeated conversion to proprietary file formats. Although XML is the preferred language, any extensible markup language with the facility for data description tags could be used as a file format for data storage in the metastore.

Figure 4:
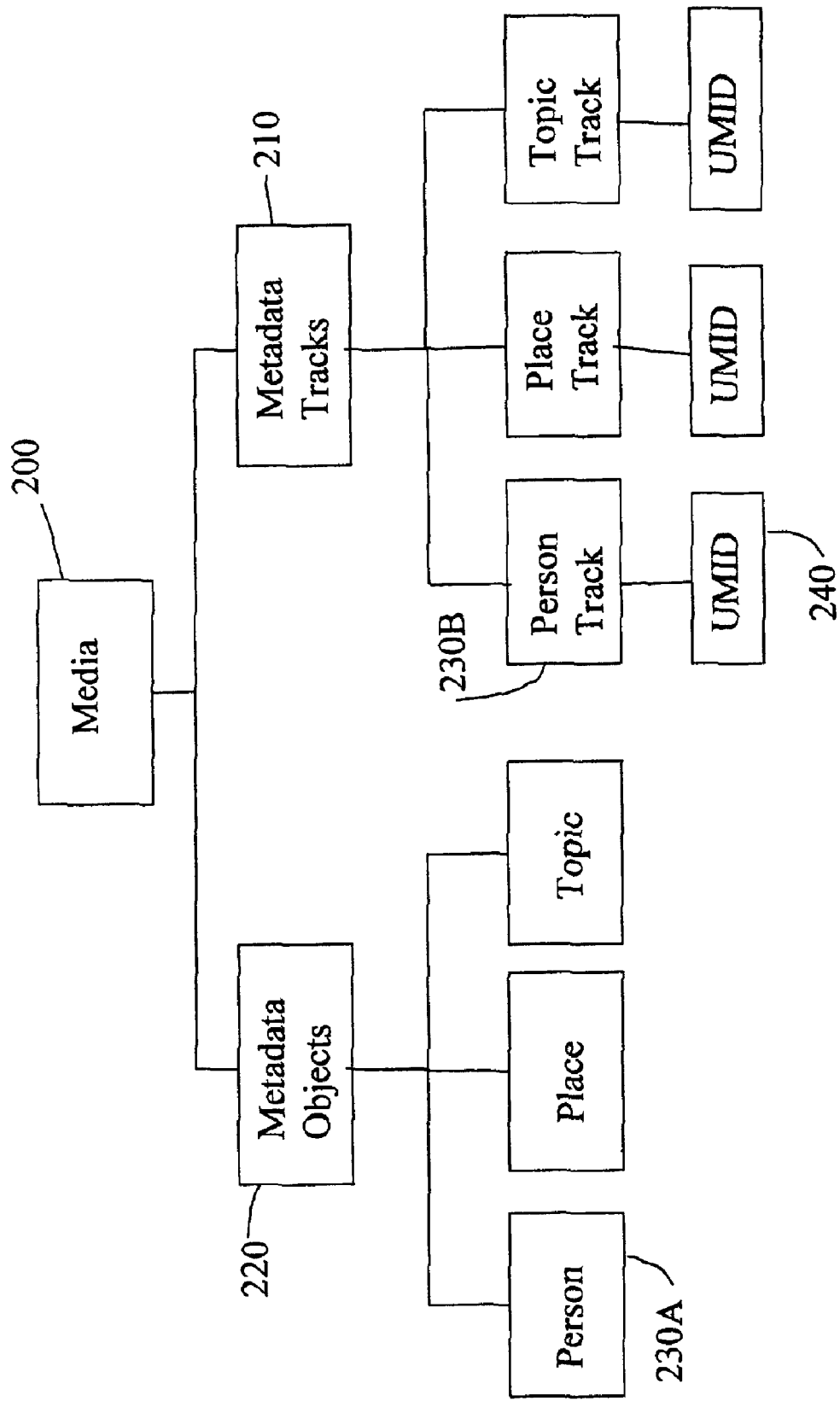

An example portion of an XML file that might be used in embodiments of the invention is shown in FIG. 4. The <media> tag occurs at the top level of the hierarchy and contains at the next level down, the "metadata objects" element and the "metadata tracks" element. The child elements of the metadata objects are shown as elements for person, place and topic, each of which has an "href" attribute. This attribute provides a link to an image associated with the respective metadata object. The body of each element contains the information itself, for example there are person elements in FIG. 4 that mark the names of Bill Clinton and Nelson Mandela. The metadata object elements mark text-based descriptions of objects that appear in the images while the metadata tracks provide an index to the subset of images of a clip in which the particular metadata object associated with the metadata track features. The UMID is included as a child element of the metadata tracks. The advantage of explicitly providing an index to the subset of images in which an object appears is that rather than downloading an entire video clip with which the object is associated, only the subset of images and the associated audio in which the metadata object appears need be downloaded from the video store. This reduces download time and saves bandwidth. The full clip can also be downloaded if so required.

FIG. 5 shows the hierarchical structure of the XML metadata file of FIG. 3. The media tag 200 is at the top level of the hierarchy. The metadata objects 220 and the metadata tracks 210 are both child elements of the media element 200. Each metadata object has a corresponding metadata track partner. This is illustrated by the person element 230A which corresponds to the person track 230B. The UMID elements 240 are at the lowermost level of the hierarchy in this case.

The fact that the interchange between the client and the database is in XML provides advantages over the prior-art systems. In particular, the XML interface between client and database allows complex queries to be constructed using XML query language. The software interfaces between the client and the metastore are independent of the particular data schema used by the customer which means that the customer has the freedom to design and use his own specific business schema in conjunction with the video material database according of the invention. The video information retrieval system of the present invention also allows for easy integration of proprietary video content-extraction tools and database systems from other vendors.

The XML file 155 will include URLs for low bandwidth and full bandwidth versions of the video clips. The user may require full bandwidth video material for use with high-end equipment or to include in a television broadcast. Low bandwidth video material may be required by the user for viewing on low-end equipment for editing purposes or for transmission across computer networks. The XML file will also provide links to still images such as the representative keystamp (RKS) images for each of the video clips highlighted by the search query. The RKS images are located by a CGI script hosted by a web server which takes the UMID and the timecode as parameters.

The XML file is converted to HTML and displayed in the client's browser. The user at the client computer makes a decision as to which video material to download on the basis of the metadata provided. To download the video material the user initiates a client request 165 which is directed to the appropriate video server using the URL and UMID information contained in the XML file 155.

Although the metadata can be stored in the databases 130 in any format, because the exchange of data between the databases 130 and the client 100 is in XML, it may also be convenient to store metadata in hierarchical formats in the databases 130 using XML. The databases 130 could use an object database to store the XML metadata files. The hierarchical structure of XML means that it is more efficient to store complex XML files in an object database rather than a relational database. The XML is parsed into object structures prior to being stored in the object database. The use of the object database has the advantage that the information is stored in a format which makes it easy to access elements and attributes rapidly without the requirement of loading and parsing of a sequential file.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video information retrieval system comprising:
   a client system having:
     (i) means for issuing a search request in respect of desired video material; and
     (ii) means for accessing video material using uniform resource locator (URL) and a SMPTE unique material identifier (UMID);
   a server system having:
     (i) access to one or more databases containing metadata information relating to a plurality of video material items, a UMID associated with each video material item and at least one URL associated with each UMID;
     (ii) means for receiving a search request from said client system and detecting one or more video material items for which metadata information stored in at least one of said database(s) substantially corresponds to said search request;
     (iii) means for supplying said metadata information, said URL and said UMID relating to said one or more detected video material items to said client system;
     (iv) and at least one video repository having:
     (v) a video storage arrangement storing video material and associated UMID data;
     (vi) in which said metadata, said URL and said UMID are communicated between said server and said client using a markup language having descriptors for data content.

2. A system according to claim 1, in which said search requests are communicated between said server and said client using a markup language having descriptors for data content.

3. A system according to claim 1, in which said database stores metadata in a hierarchical representation using a markup language having descriptors for data content.

4. A system according to claim 1, in which said markup language is an extensible markup language (XML).

5. A system according to claim 1, in which said client and said server communicate via http port 80.

6. A system according to claim 1, in which said server system is operable to supply URLs to said client system for accessing said video material in a broadcast-quality representation.

7. A system according to claim 1, in which said server system is operable to supply URLs to said client system for accessing said video material in a sub-broadcast-quality representation.

8. A system according to claim 1, in which said server system is operable to supply URLs and video timecodes to said client system for accessing single images representative of said content of the video material.

9. A system according to claim 1, in which said server, said client and said video repository communicate via a world wide web.

10. A video information server having:
    (i) access to one or more databases containing metadata information relating to a plurality of video material items, a SMPTE unique material identifier (UMID) associated with each video material item and a uniform resource locator (URL) associated with each UMID;
    (ii) means for receiving a search request from a client system and detecting one or more video material items for which metadata information stored in at least on of said database(s) substantially corresponds to said search request;
    (iii) means for supplying said metadata information, said URL and said UMID relating to said one or more detected video material items to said client system using a markup language having descriptors for data content.

11. A video information retrieval client system comprising:
    (i) means for issuing a search request to a video information server system in respect of desired video material;
    (ii) means for receiving search results from said server system comprising at least a uniform resource locator (URL) and a SMPTE unique material identifier (UMID); and
    (iii) means for accessing video data from a video repository using said URL and said UMID data;
    (iv) in which, said URL and said UMID are communicated between said server and said client using a markup language having descriptors for data content.

12. A method of video information retrieval using a server system having access to one or more databases containing metadata information relating to a plurality of video material items, a SMPTE unique material identifier (UMID) associated with each video material item and a URL associated with each UMID; said method comprising the steps of:
    (i) a client system issuing a search request in respect of desired video material;
    (ii) said server system receiving said search request from said client system and detecting one or more video material items for which metadata information stored in at least one of the database(s) substantially corresponds to said search request; and
    (iii) said server system supplying said metadata information, said URL and said UMID relating to said one or more detected video material items to said client system using a markup language having descriptors for data content;
    (iv) said client system accessing video material on the basis of said uniform resource locator (URL) from a video repository having a video storage arrangement storing video material and associated UMID data.

13. Computer software having program code for carrying out a method according to claim 12.

14. A data providing medium by which computer software according to claim 13 is provided.

15. A medium according to claim 14, said medium being a transmission medium.

16. A medium according to claim 14, said medium being a storage medium.

17. A video information retrieval system comprising:
    a client system having:
      (i) a request issuer to issue a search request in respect of desired video material; and
      (ii) a video accessor to access using a uniform resource locator (URL) and a SMPTE unique material identifier (UMID);

a server system having:
(i) access to one or more databases containing metadata information relating to a plurality of video material items, a UMID associated with each video material item and at least one URL associated with each UMID;
(ii) a receiver to receive a search request from said client system and detecting one or more video material items for which metadata information stored in at least one of said database(s) substantially corresponds to said search request;
(iii) an information supplier to supply said metadata information, said URL and said UMID relating to said one or more detected video material items to said client system;
(iv) and at least one video repository having:
(v) a video storage arrangement storing video material and associated UMID data;
(vi) in which said metadata, said URL and said UMID are communicated between said server and said client using a markup language having descriptors for data content.

18. A video information server having:
(i) access to one or more databases containing metadata information relating to a plurality of video material items, a SMPTE unique material identifier (UMID) associated with each video material item and a uniform resource locator (URL) associated with each UMID;
(ii) a receiver to receive a search request from a client system and detecting one or more video material items for which metadata information stored in at least on of said database(s) substantially corresponds to said search request;
(iii) an information supplier to supply said metadata information, said URL and said UMID relating to said one or more detected video material items to said client system using a markup language having descriptors for data content.

19. A video information retrieval client system comprising:
(i) a request issuer to issue a search request to a video information server system in respect of desired video material, said video information server system having access to one or more databases containing metadata information relating to a plurality of video material items;
(ii) a receiver to receive search results from said server system comprising at least a uniform resource locator (URL) and a SMPTE unique material identifier (UMID); and
(iii) a video accessor to access video data from a video repository using said URL and said UMID data;
(iv) in which said metadata, said URL and said UMID are communicated between said server and said client using a markup language having descriptors for data content.

* * * * *